United States Patent [19]

Schmidt et al.

[11] 4,358,144
[45] Nov. 9, 1982

[54] SELF-RELEASING CHOKER

[76] Inventors: Phillip A. Schmidt, 30336 - 13th Ave. S., Apt. B, Seattle, Wash. 98003; James H. Norton, 3134 SW. 172nd, Seattle, Wash. 98166

[21] Appl. No.: 223,934

[22] Filed: Jan. 9, 1981

[51] Int. Cl.³ .............................................. B66C 1/38
[52] U.S. Cl. ................................ 294/75; 294/78 R; 294/83 R; 294/110 R; 294/116
[58] Field of Search ............... 294/74, 75, 78 R, 83 R, 294/83 A, 84, 86.17–86.2, 86.27–86.33, 88, 110 R, 113, 115, 116

[56] References Cited

U.S. PATENT DOCUMENTS

| 2,732,245 | 1/1956 | Lemoigne | 294/83 A |
| 2,964,347 | 12/1960 | Mitchell | 294/75 X |
| 3,081,122 | 3/1963 | Jungersen | 294/83 R |
| 3,104,909 | 9/1963 | Walker | 294/75 |
| 3,163,401 | 12/1964 | Johnston et al. | 294/75 X |

Primary Examiner—Johnny D. Cherry
Attorney, Agent, or Firm—Seed, Berry, Vernon & Baynham

[57] ABSTRACT

A self-releasing choker has ferrule holding jaws in a casing movable between a ferrule accepting station, a load carrying station, and a ferrule releasing station located intermediate the other two stations. Locking means holds the jaws closed while in the load carrying station and releasing means permits the jaws to open only while they are moving past the ferrule releasing station in the direction of the ferrule accepting station. Dampening means provides a time delay to keep the jaws from moving all of the way to the ferrule releasing station when the load is only momentarily taken off the ferrule.

12 Claims, 24 Drawing Figures

FIG. 5
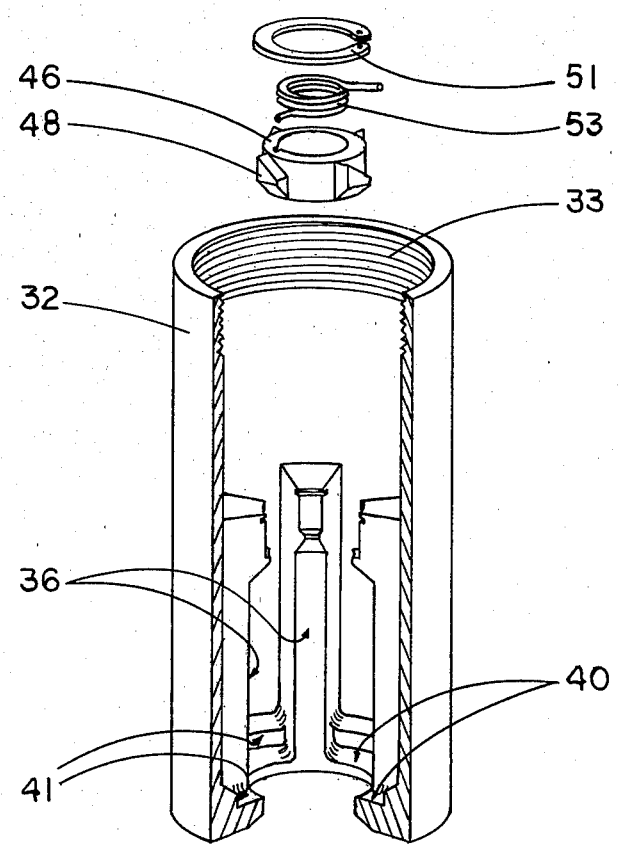
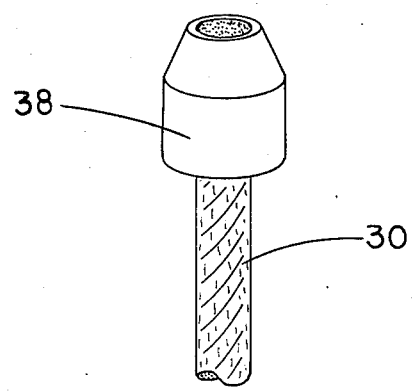

FIG. 6
FIG. 7
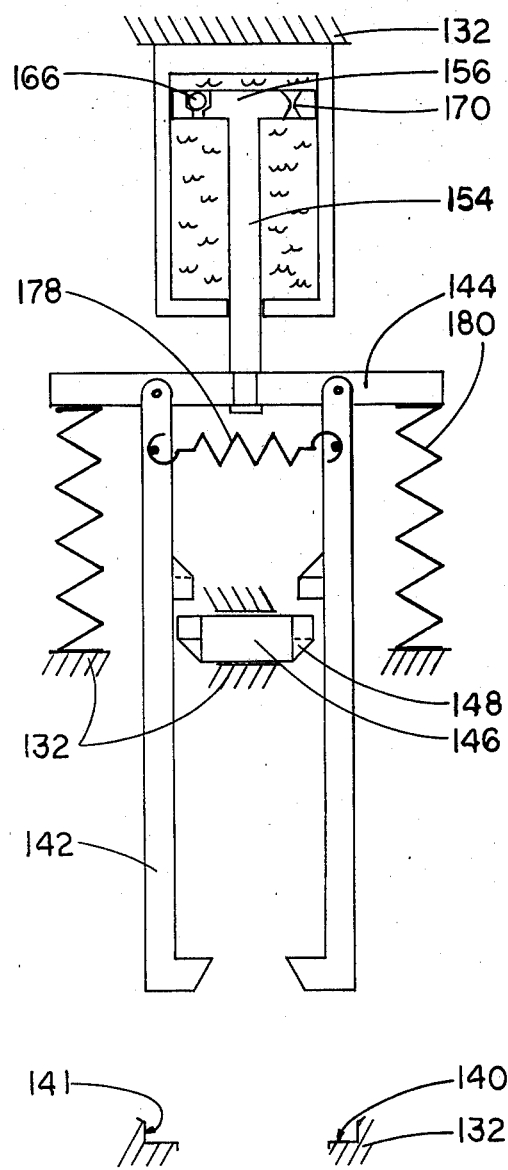
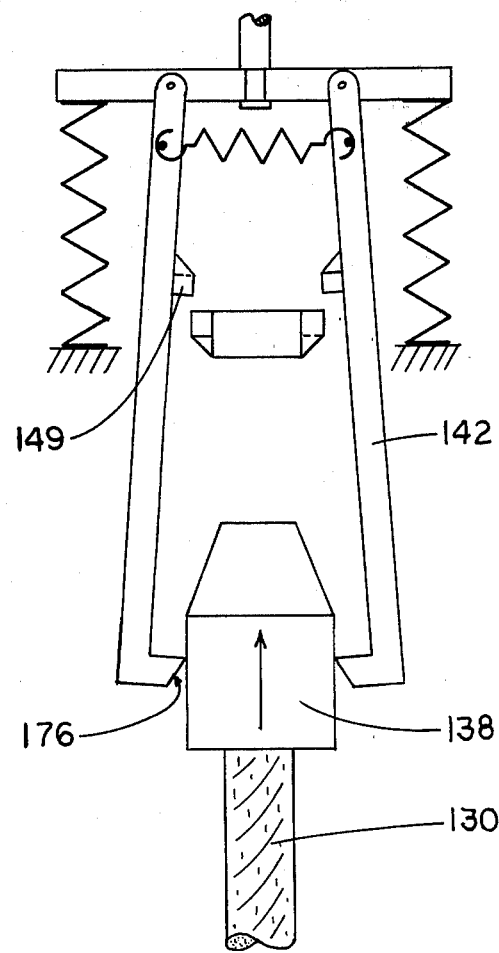

FIG. 12
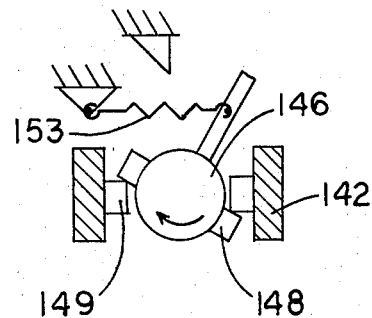
FIG. 11
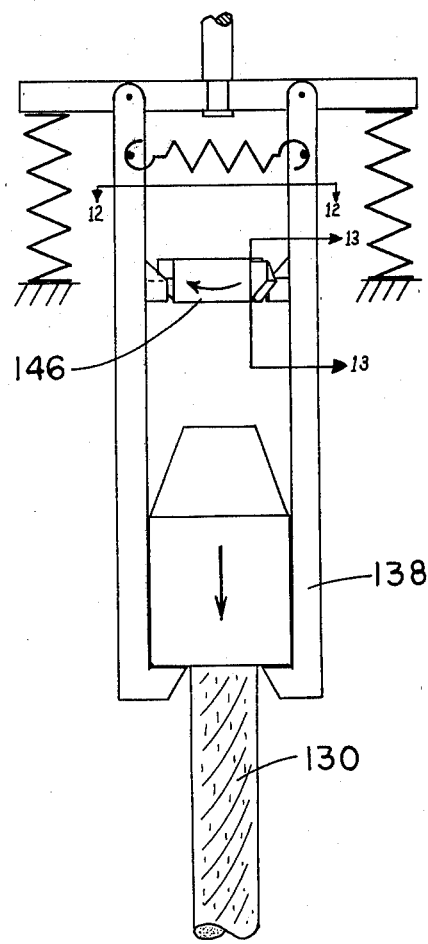
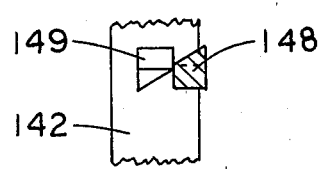
FIG. 13

FIG. 15
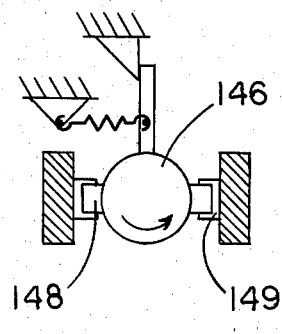
FIG. 14
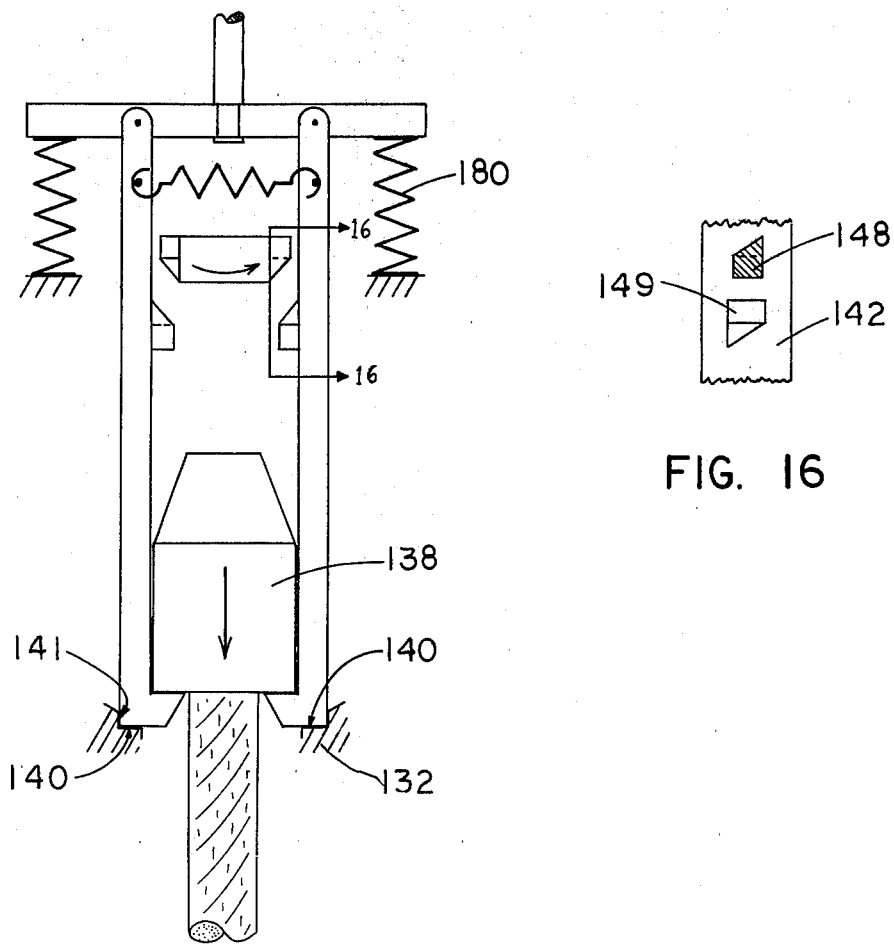
FIG. 16

FIG. 19
FIG. 20
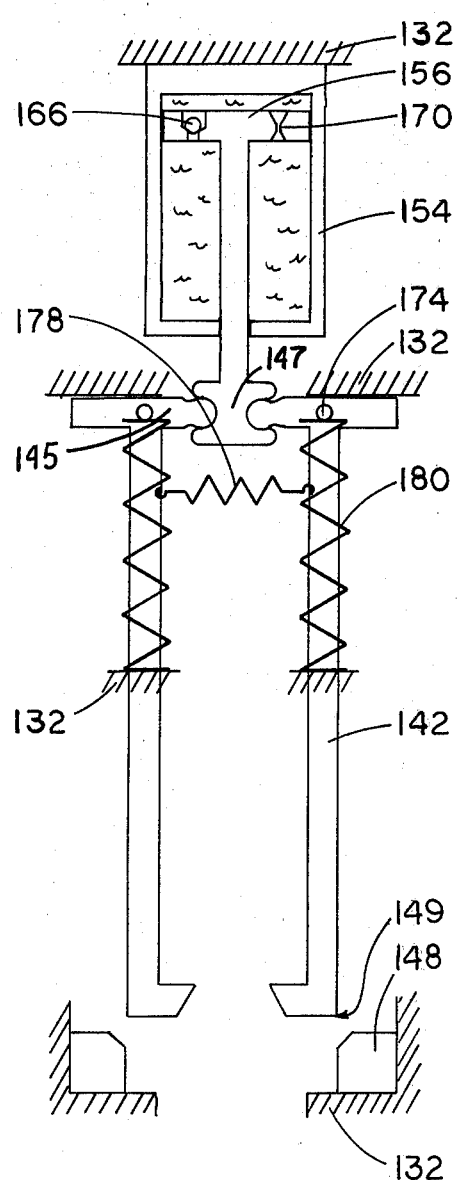
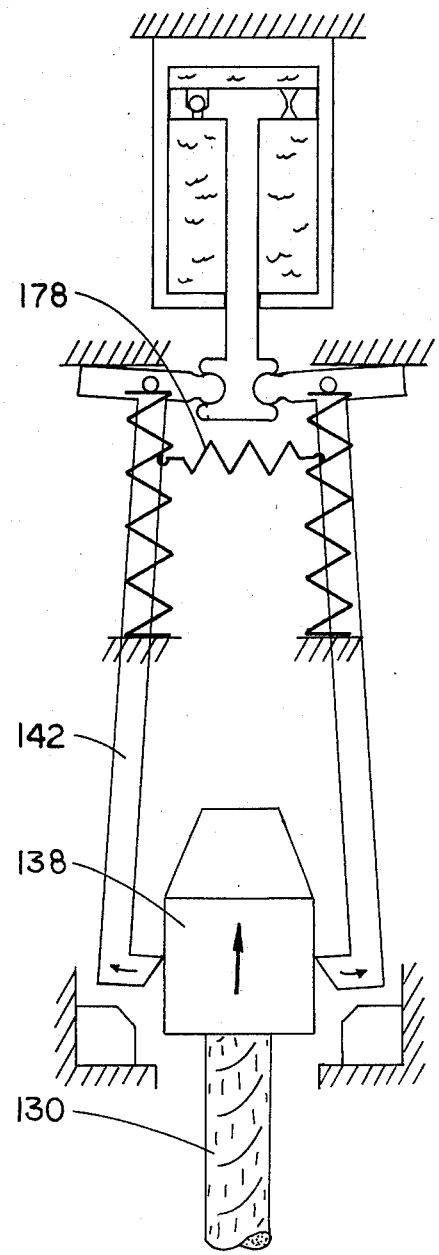

FIG. 21
FIG. 22
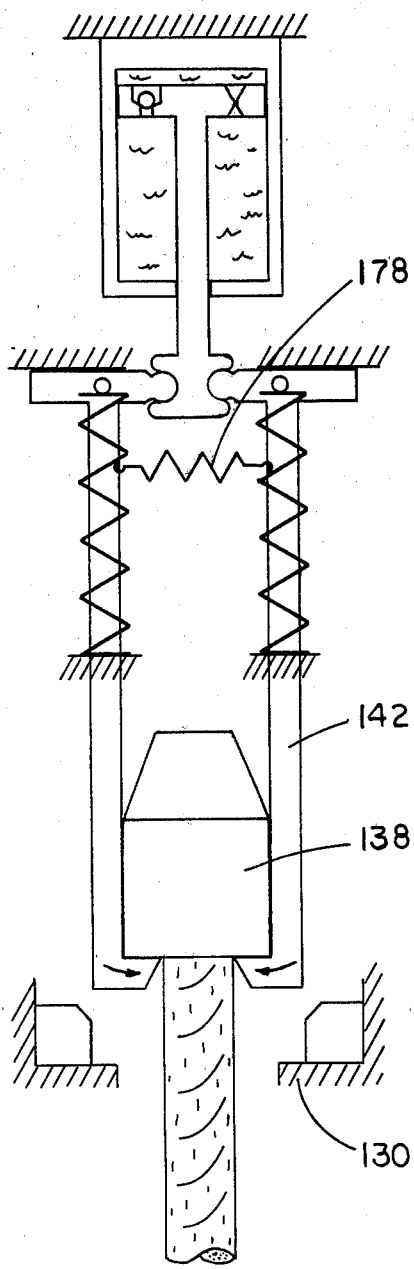
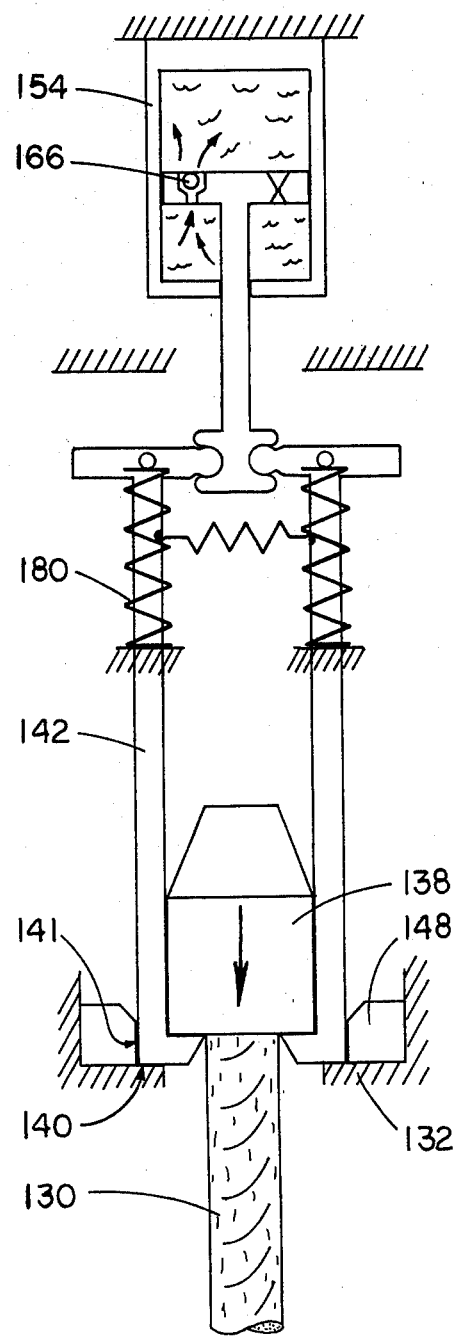

FIG. 23
FIG. 24
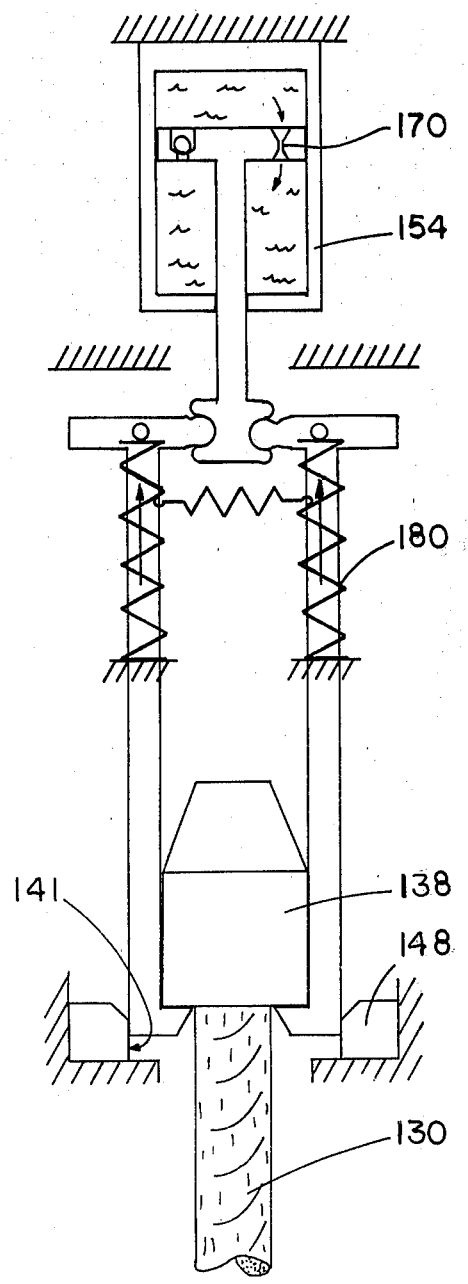
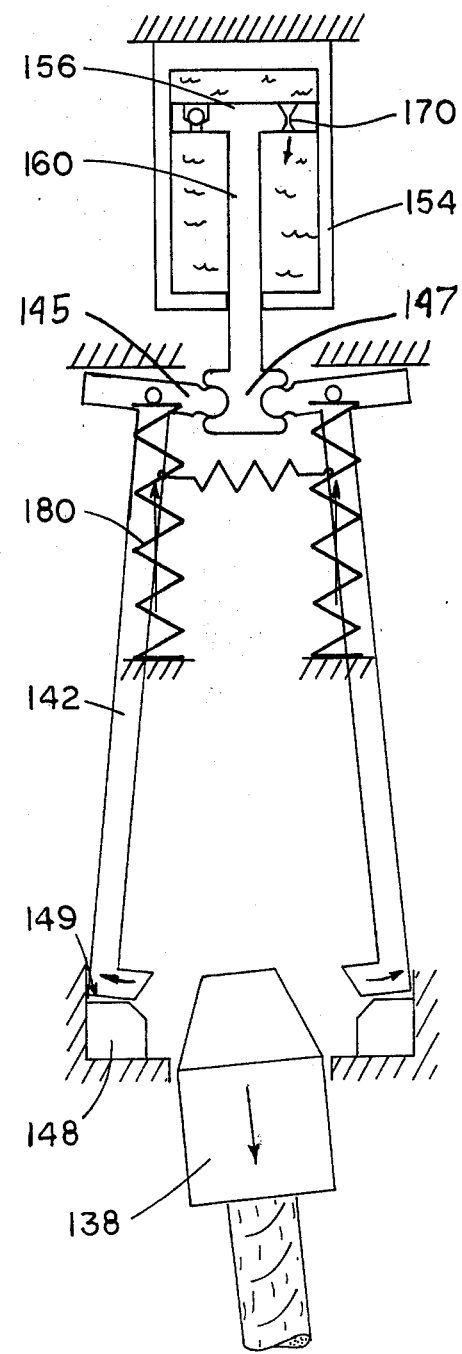

SELF-RELEASING CHOKER

DESCRIPTION

1. Field of the Invention

This invention relates to fastening mechanisms which release automatically upon the relaxation of tensile forces. Specifically, this invention is designed to operate as a self-releasing choker for logging operations; however, the invention has numerous possible other uses in a variety of fastening applications.

2. Background Art

Presently most choker hooks and other tensile force connectors are released either by hand or by special equipment such as lines, levers, wires or radio control devices. This invention eliminates the need for much of this. To disconnect an embodiment of the invention from a load, the only requirement is that the tensile force exerted by the load be released for a predetermined number of seconds. Release is simple, yet the basic design allows the invention to be constructed to handle enormous loads.

DISCLOSURE OF THE INVENTION

This invention has numerous fastening and hoisting applications. It has particular value for operations in which disconnection is difficult due to size and shape of the load or due to location. An example is use as a self-releasing choker which can reduce substantially the cost of many logging operations. A brief description of logging processes may be helpful.

In most logging operations the felled logs are hoisted or dragged out of the forest with a simple cable noose called a choker. Referring to FIG. 1, a choker cable (30) is first fastened to itself around a log using a sliding choker hook 31. Second, tension is applied, the choker cinches up around the log and the log is pulled to a desired location. Third, the tension is released from the choker and the choker must be unhooked. The unhooking is performed by a workman called a chaser. Fifth, the choker is returned to the woods to be used again.

Much of the cost of logging is incurred during the third or choker releasing phase of the operation. A self-releasing choker can make logging more economical for three reasons. Such a choker is safer to use, it eliminates the need to hire a chaser and it reduces the choker release time.

A primary object of this invention is to provide a reliable self-releasing fastening mechanism for cables, ropes, lines or rods tensioned by a load which will release upon the relaxation of the tension and does not require any outside signal for release other than the release of the tension.

Another object of this invention is to provide such a self-releasing fastening device that is capable of withstanding extremely large tensile force loads.

Another object of this invention is to provide a system for delaying the release of the load a specified length of time ater the tensile force is relaxed so as to prevent premature release should the load oscillate in a manner briefly releasing tension.

A further object of this invention is to provide a self-releasing mechanism which requires little manual effort to connect to the load.

A device embodying the present invention has jaws or some other load holding means movable relative to a support between (a) a load accepting station whereat the load holding means is free to accept a load and move to a load retaining position; (b) a load carrying station whereat the load holding means is held in load retaining position; and (c) a load releasing station located intermediate said load accepting and carrying stations whereat the holding means can move from its load retaining position to a load accepting position. Locking means is located at the load carrying station for keeping the jaws or other load carrying means in its load retaining position in opposition to a release mechanism. Releasing means is provided having an inactive mode when the load holding means is moving past the load releasing station from the load accepting station to the load carrying station, and having an active releasing mode when the load is moving past the load releasing station back toward the load accepting station.

The device also has return means for the load holding means acting between the load holding means and the support for yieldingly resisting movement of the load holding means from the load accepting station toward the load carrying station responsive to application of the load to the load holding means. The return means preferably includes a spring to resist movement of the load holding means toward the load carrying station and dampening means for slowing spring return of the load holding means from the load carrying station toward the load releasing station.

BRIEF DESCRIPTION OF THE DRAWINGS

FIGS. 3-5 are axonometric exploded views of the internal mechanism of the invention.

FIGS. 6-18 are schematics showing the operation sequence.

FIGS. 19-24 are schematics showing the operating sequence of a second embodiment of the invention.

Figure 1:
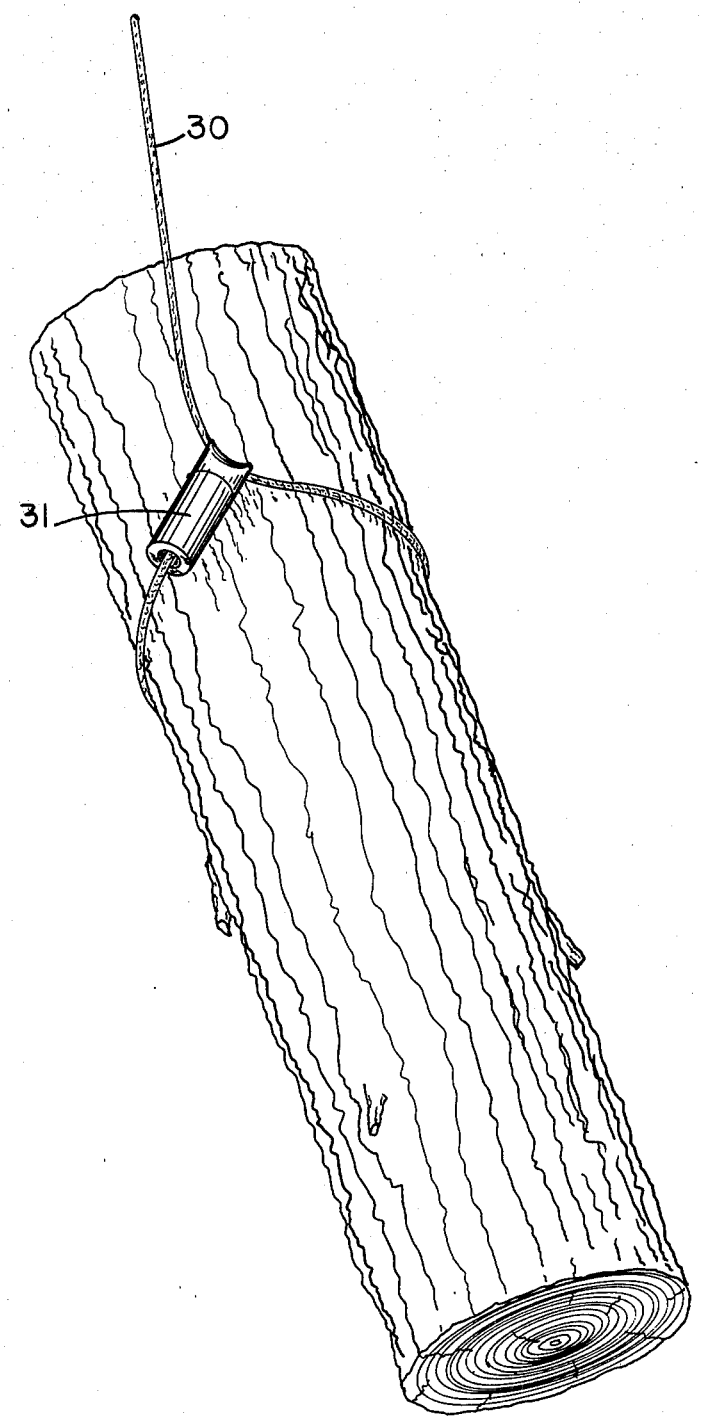
FIG. 1 shows a self-releasing choker embodying the invention being used to fasten a cable around a log.
Figure 2:
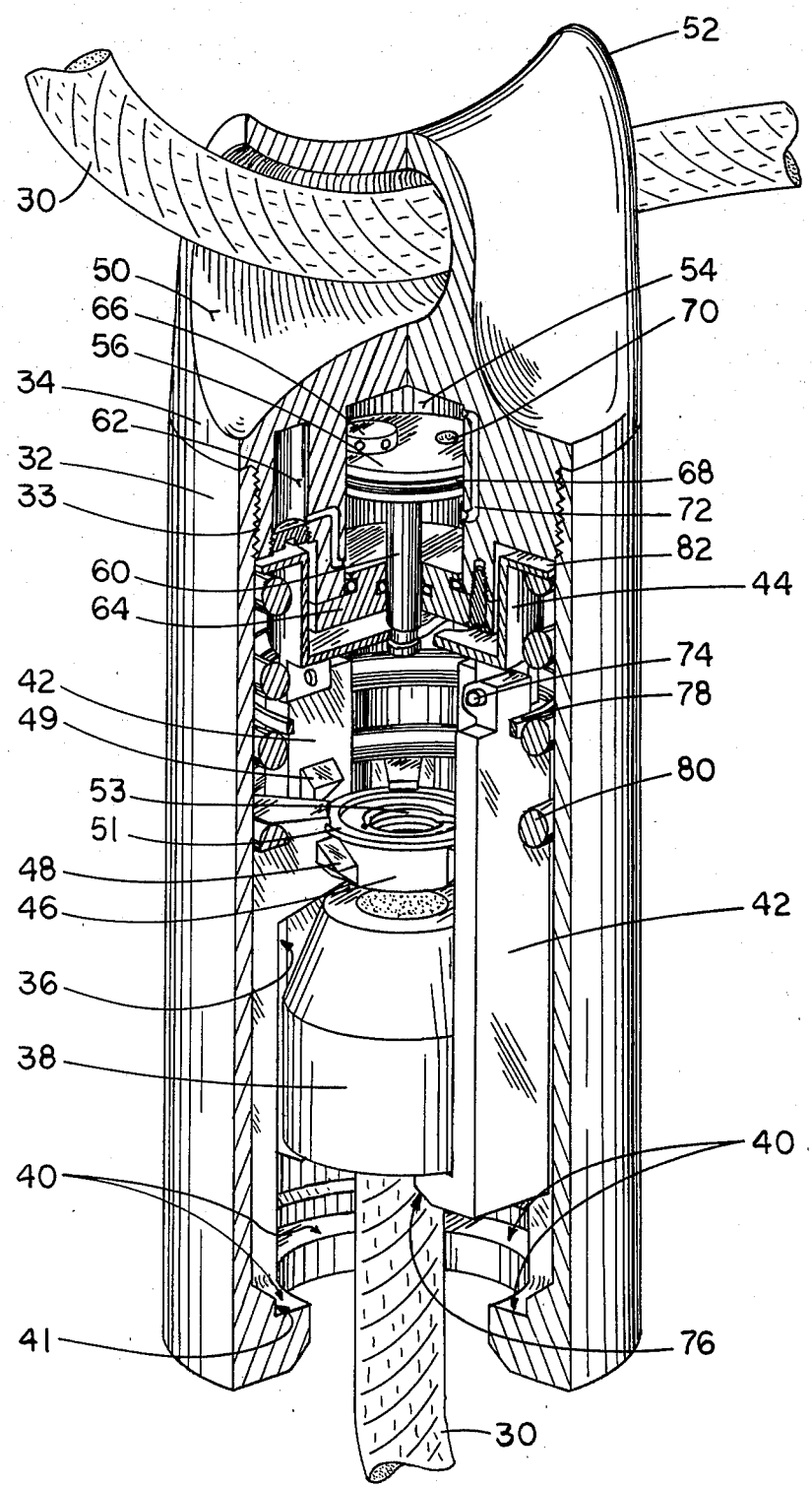
FIG. 2 is an axonometric view of the choker with a quarter section removed, with the cable ferrule 38 shown inserted and all parts oriented as they would be at the load accepting station before tension is applied to the cable.
Figure 3:
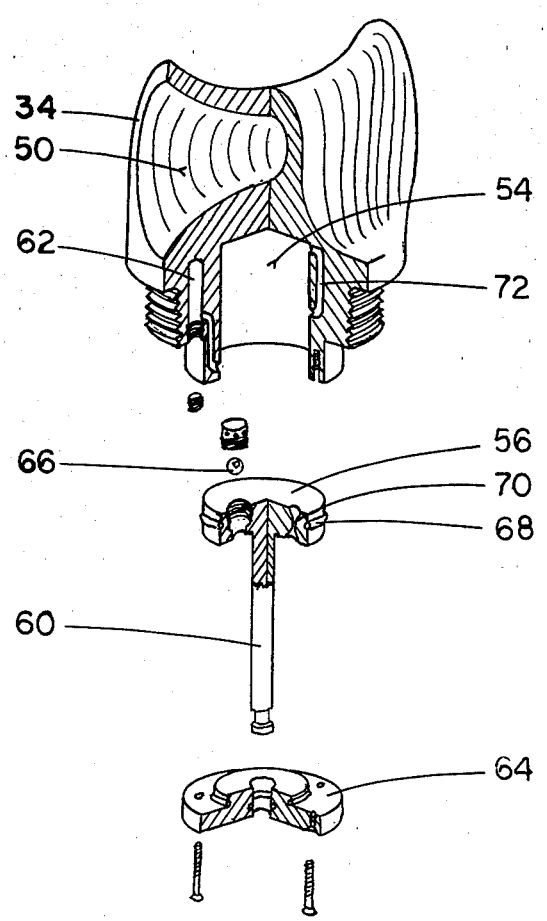
Figure 4:
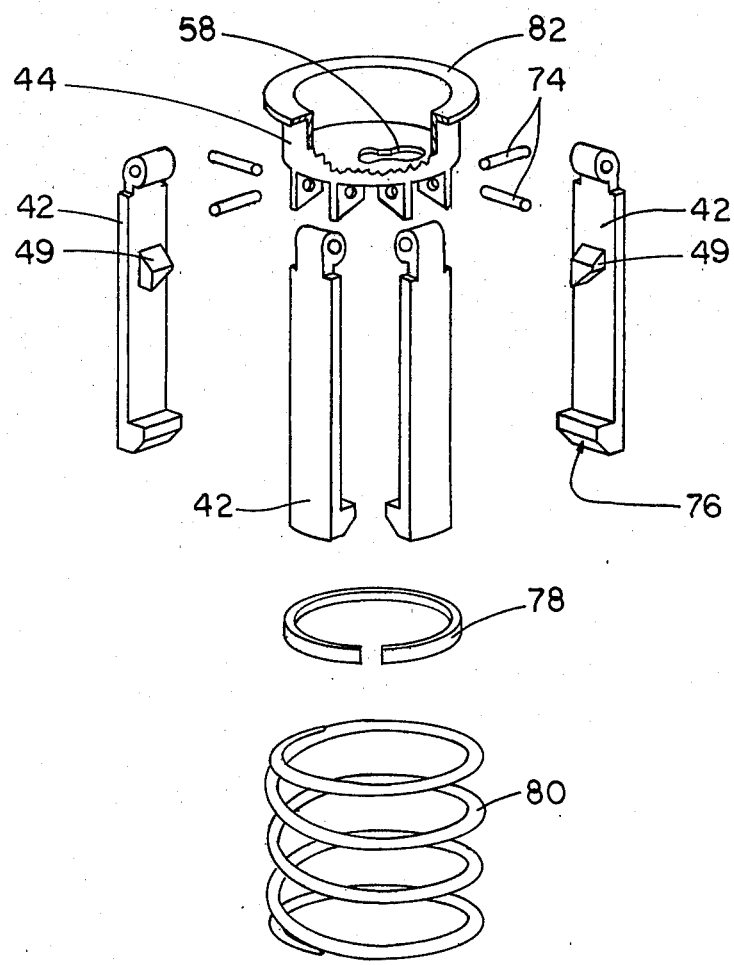

When a part appearing in FIGS. 2-5 also appears in one or more of FIGS. 6-24, that part has its last two digits identical in all views. For example, a part labeled 33 in FIG. 5 would be labeled 133 in FIG. 16.

BEST MODE FOR CARRYING OUT THE INVENTION

The following description of one form of this invention refers to FIGS. 2, 3, 4 and 5. The description is divided into three main sections. The first section deals with the case, the second treats the cap and the third describes the jaw assembly.

1. Case (see FIGS. 2 and 5)

The case 32 is cylindrical and is formed with machine threads 33 to join the case to the cap 34. The case 32 contains four guides 36 which serve to position the cable ferrule 38 along the central vertical axis of the invention. The guides 36 allow sufficient clearance for the ferrule 38 to move freely along their length even when soil covered. They do, however, fit close enough to the diameter of the ferrule 38 to prevent the ferrule from twisting to one side and jamming within the guides. The edge of the guides 36 facing the ferrule may have a surface which is hardened to withstand abrasion and to reduce friction.

An important feature of the case is the jaw rests 40 located at the load carrying station near the opening at the bottom. There is one jaw rest 40 for each jaw 42. The jaw rests 40 are designed to withstand the impact loads which the jaws 42 will subject them to during normal operation. The jaw rests allow the major portion of the load force to be carried by the case and lower tip of the jaws rather than by the upper section of the jaws and the jaw carrier 44. This permits the upper jaws and other internal parts to be designed for minimum weight rather than for heavy load carrying capacity. The case can be more easily designed to handle large tensile and bending loads than can the relatively delicate internal parts.

Besides these other functions, the case is designed to hold the cam ring 46 and thus the case cams 48. The cam ring is connected to the case cams 48 and is allowed to rotate approximately 30 degrees about the vertical axis of the invention, while being restrained from vertical motion by a circular clip 51. The rotation of the cam ring is restrained by the ring spring 53. This rotating action of the cam ring takes place when contact is made between the case cams 48 and the jaw cams 49 during downward travel of the jaws 42 and jaw cams 49.

2. Cap (see FIGS. 2 and 3)

The cap 34 is the second largest part of the invention and performs several functions. It seals to the case 32 with threads 33, which allow easy disassembly. It contains a cable passage 50 for cable attachment and a complete damping mechanism for time delay.

If the invention is used on a logging choker, the choker cable passes through the cable passage 50. Curved flanges 52 prevent damage to the cable by eliminating sharp bending angles. Other shapes besides that shown may be manufactured into the cap to meet the requirements of different uses.

The center and bottom of the cap 34 contain the hydraulic damping mechanism which consists of a cylinder 54 within which is a piston 56 which travels vertically along the longitudinal center axis of the case 32. Cylinder 54 is filled with hydraulic fluid which restricts the motion of the piston 56. This piston is circumferentially grooved at its lower end to interfit with the side edges of the narrow end of a keyhole slot connection 58 formed in the base of the jaw carrier 44 (see FIG. 4). This piston to jaw carrier connection 58 is designed in such a way that the two parts move vertically together in operation, and yet, when the cap 34 is removed, the piston shaft 60 can be pushed to one side disengaging it from the jaw carrier 44. This feature permits easy disassembly.

An expansion chamber 62 is built into the cap as part of the damper to allow expansion of the hydraulic fluid due to temperature changes. The damper cap 64 holds the complete damping mechanism together and is sealed with two O-rings. During the downward stroke of the damper piston 56 a ball check valve 66 is forced off of its seat and the majority of the hydraulic fluid is passed through the piston. This allows a high piston velocity and the jaws 42 are permitted to move quickly to the bottom of their travel. When the piston is pushed upward, the ball check valve 66 seals the bypass through the piston and the fluid above the piston 56 is put under pressure. This fluid is prevented from seeping around the piston by the piston O-ring 68; and thus it must pass through a metering orifice 70. Hence, the piston 56 is caused to travel slowly upward giving the desired damping effect. When the piston reaches the bypass 72, fluid is routed around the piston and quick upward motion of the piston is obtained. This quick travel forces the jaws 42 to open rapidly, thus avoiding jamming of the mechanism.

3. Jaw Assembly (see FIGS. 2 and 4)

The jaws 42 are generally L-shaped to fit closely around the cable ferrule 38 and grip the underside thereof. They are fastened at their upper end to the jaw carrier 44 with pivot pins 74. The gripping lip at the bottom of each jaw 42 is beveled at 76 on the underside. When the head of the ferrule is forced against this bevel 76, the jaws separate thus admitting the ferrule 38. A circular spring 78 closes the jaws behind the ferrule, holding it securely. The jaw carrier 44 has an outer flange 82 which rides on a main spring 80. The jaws 42 and jaw carrier 44 are together guided during their vertical motion by contact with the inner wall of the case 32 and the case cams 48.

The entire internal mechanism of the device may be protected from mud and debris by an outer boot (not shown). This boot is designed to loosely cover the hole at the bottom of the case. When the cable and ferrule must be inserted, the boot is moved to one side to admit the ferrule.

Operating Sequence (see FIGS. 6–18)

The following is a description of the basic principle of operation of the above described embodiment of the invention. FIG. 6 is a schematic elevation view of the components of the invention at the load accepting station. Two jaws 142 are shown hinged to the jaw carrier 144 with a resilient means 178 forcing the jaws toward one another. The jaws are held a specified distance apart by the cam ring 146 together with the case cams 148. The cam ring is fastened to the case 132 and is allowed to rotate but is restrained from vertical motion. Each jaw has a jaw cam 149 fastened to it which contacts the case cams 148 during certain stages of operation. The jaw carrier 144 is connected to a velocity damping means comprising a hydraulic damper piston 156. The jaw carrier 144 with jaws 142, resilient means 180 and jaw cams 148 will be referred to as the jaw assembly. This assembly is restrained within the case 132 such that, as a unit it is allowed only to move vertically. This vertical motion takes place against resilient means 180. The damping means consists of a hydraulic cylinder 154 which is fastened to the case, a metering orifice 170, a one-way ball check valve 166 and light hydraulic fluid.

In FIG. 6 the component parts are in a rest position. Given no outside forces, the device will remain in this configuration indefinitely. FIG. 7 is an elevation view similar to FIG. 6, but for simplicity of viewing, the damping means has not been drawn. A cable ferrule 138 is shown being manually inserted between the jaws 142, forcing them into the load accepting position. Due to resilient means 178, the jaws close back to the load holding position once insertion of the ferrule is complete.

Figure 9:
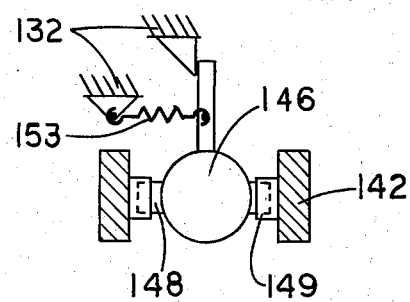
Figure 8:
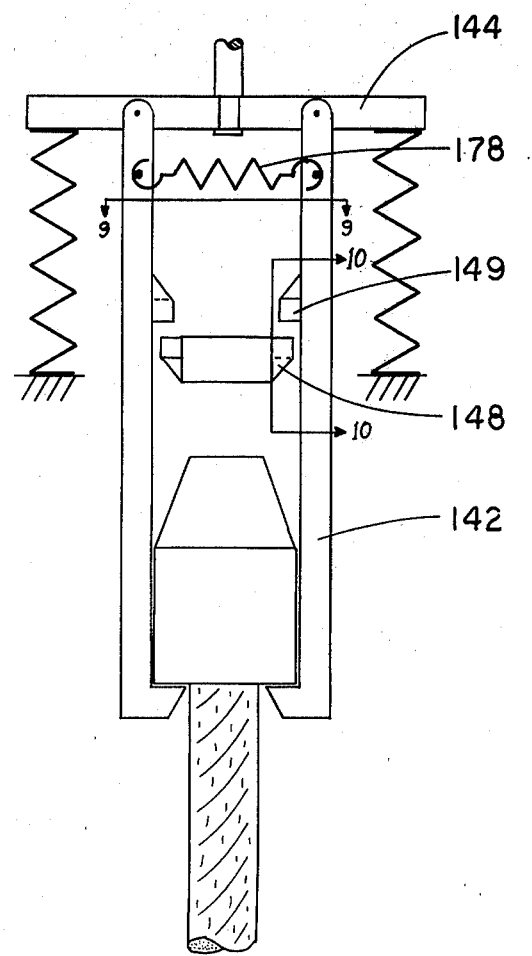
Figure 10:
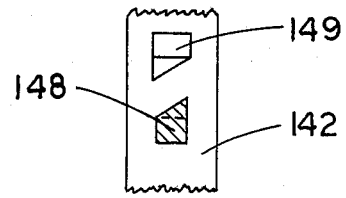

FIG. 8 shows the ferrule completely inserted with the jaws in the load holding position. FIGS. 9 and 10 show, respectively, a plan view and a side elevation view of the resting position of the cam ring 146 with case cams 148, jaws 142 and jaw cams 149. Resilient means 153 is shown applying a rotational force to the cam ring 146. FIGS. 11 through 16 show the result of an applied force to the inserted cable and ferrule 138. When the load force is applied, the jaw assembly is forced downward toward the load carrying station. FIGS. 11, 12 and 13 show an intermediate position in this downward travel, while FIGS. 14, 15 and 16 show the jaw assembly at the load carrying station. The damping mean provides almost no resistance to this downward motion.

FIGS. 12 and 13 show the action of the cams as they interact during the downward travel. Due to the shape of the case cams 148 and the jaw cams 149, the cam ring 146 is forced to rotate. This action moves the case cams 148 out of the line of motion of the jaw cams 149. Once the jaw cams 149 have moved fully past the case cams 148, the cam ring 146 is free to be rotated back to its original position by the resilient means 153.

FIGS. 14, 15 and 16 show the jaw assembly at the load carrying station. The cam ring 146 has rotated back to its resting position and the jaw cams 149 and case cams 148 are no longer in contact. The resilient means 180 has reached its maximum compression. The jaws 142 bear against the lower end of the case 132 at the jaw rests 140. The case 132 is thus allowed to carry most of the applied load, eliminating much of the stress within the length of the jaws. Load securing faces 141 keep the jaws in the load retaining position while at the load carrying station.

Figure 17:
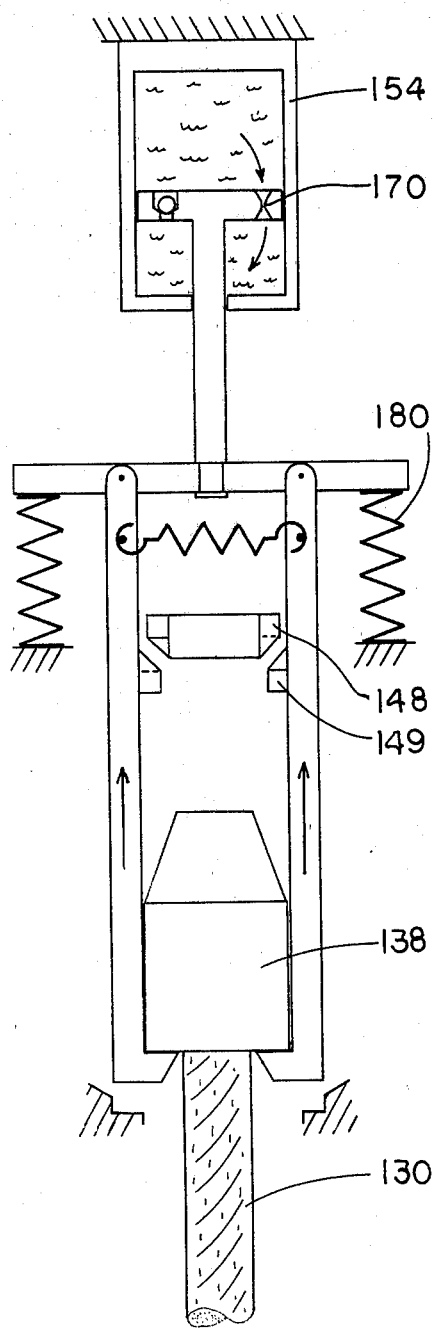

FIG. 17 shows the motion of the jaw assembly when the force on the cable is eliminated. The damping means 154 slows the jaw assembly as it moves from the load carrying station to the load releasing station. This damping protects against premature release of the ferrule. Many loads have an oscillating nature, alternately applying and releasing the force on the ferrule. Damping prevents the load from being released during these oscillations, allowing release to occur only after a prescribed time period. If a force is reapplied to the cable 130 before the jaw assembly reaches the load releasing station, the assembly returns to the bottom of its travel without releasing the ferrule.

Figure 18:
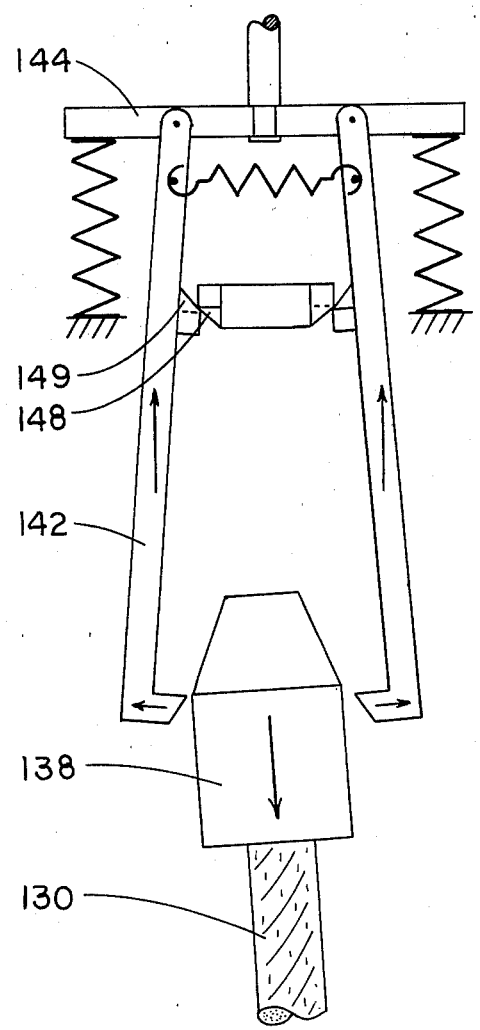

FIG. 18 shows the jaw assembly at the load releasing station. When the jaw cams contact the case cams, the shape of the cams prevents the cam ring from rotating as it did on the downward motion of the jaw assembly. The jaw cams 149 must ride up over the case cams 148, forcing the jaws 142 to swing open, thereby releasing the ferrule. The ferrule 138 is forced downward at this time by a small resilient means (not shown). This insures that it will not be accidentally reinserted into the jaws. At the load releasing station, damping is decreased to allow the releasing action to take place quickly. This prevents jamming of the mechanism. Once the ferrule is released, the jaw assembly continues its upward motion until the jaw cams 149 no longer contact the case cams 148 and the jaws again return to the load accepting station. From this position the cycle may be repeated.

SECOND EMBODIMENT

The following is a description of the basic principle of operation for an alternate form of this invention illustrated by FIGS. 19 through 24.

FIG. 19 is a schematic elevation view of the components within the case of the invention at the load accepting station. Two jaws 142 with lever arms 145 at the top thereof are hinged to a jaw carrier represented by pins 174. Resilient means 178 aid in forcing the jaws toward one another. The jaws are held a specified distance apart by the jaw carrier. The lower corners of the jaws serve as the jaw cams 149 and the case cams 148 are fixed to the case 132.

The lever arms are pivotally connected as by a ball and socket fitting 147 to the projecting end of the rod of the damper piston 156 of a velocity damping means 154. The jaw carrier 174 with jaws 142 and resilient means 178 will be referred to as the jaw assembly. This assembly is restrained within the case such that as a unit it is allowed only to move vertically. This vertical motion takes place against resilient means 180. The damping means consists of a hydraulic cylinder which is fastened to the case 132, a metering orifice 170, a one-way ball check valve 166 and light hydraulic fluid.

FIG. 19 is a schematic of the component parts of the invention at rest. Given no outside forces, the invention will remain in this configuration indefinitely.

FIG. 20 is an elevation view similar to FIG. 19. A cable ferrule 138 is shown being manually inserted between the jaws 142, forcing them apart into the load accepting position. Due to resilient means 178, the jaws close back to the load holding position once insertion of the ferrule is complete.

FIG. 21 shows the ferrule completely inserted with the jaws in the load holding position.

FIG. 22 shows the result of an applied force to the inserted cable 130 and ferrule 138. When the force is applied, the jaw assembly is forced downward toward the load carrying station. The damping means provides almost no resistance to this downward motion.

FIG. 22 shows the jaw assembly at the load carrying station. The resilient means 180 has reached its maximum compression. The jaws 142 bear against the lower end of the case 132 at the jaw rests 140. The case is thus allowed to carry most of the applied load, eliminating much of the stress within the length of the relatively fragile jaws. The case cams 148 also serve as the load securing means which keep the jaws in the load retaining position while at the load carrying station.

FIG. 23 shows the motion of the jaw assembly when the force on the cable is eliminated. The damping means 154 slows the jaw assembly as it moves from the load carrying station to the load accepting station. This damping protects against premature release of the ferrule. If a force is reapplied to the cable 130 before the jaw assembly reaches the load releasing station, the assembly returns to the bottom of its travel without releasing the ferrule.

FIG. 24 shows the jaw assembly at the load releasing station. The damper rod 160 and main spring 180 acting together put an eccentric load on the jaws 142. The spring attempts to push the jaws up quickly while the damper allows only slow movement. The two forces combined through the lever arm 145 of the jaws result in a force which attempts to open the jaws. The jaw cams 149 follow the shape of the case cams 148 at the load releasing station and the jaws open releasing the ferrule 138. The ferrule is forced downward at this time by a small resilient means (not shown). This insures that it will not be accidentally reinserted into the jaws. Once the ferrule is released, the jaw assembly continues its upward motion until the jaw assembly returns to the load accepting station. From this position the cycle may be repeated.

From the foregoing description it will be appreciated that numerous modifications can be made within the teachings of this invention and that the invention is not limited for use as a self-releasing choker. Hence, the annexed claims are not intended to be limited to the illustrated embodiments.

I claim:

1. A device for selectively carrying and self-releasing a load comprising:

a support;

load holding means carried by the support and movable relative thereto between a load accepting position and a load retaining position, said load holding means also being movable relative to said support between (a) a load accepting station whereat the load holding means is free to accept a load and move to the load retaining position, (b) a load carrying station whereat the load holding means is held in load retaining position and (c) a load releasing station located intermediate said load accepting and carrying stations whereat the holding means can move from its load retaining position to its load accepting position;

locking means for keeping the load holding means in its load retaining position at the carrying station;

releasing means operatively associated with the load holding means, said releasing means having an inactive mode when the load holding means is moving past the load releasing station from the load accepting station to the load carrying station, and having an active releasing mode when the load is moving past the load releasing station back toward the load accepting station whereby the load holding means is moved from its load retaining position back to its load accepting position to release the load; and return means for the load holding means acting between said load holding means and said support for yieldingly resisting movement of the load holding means from the load accepting station toward the load carrying station responsive to application of the load to the load holding means.

2. A device according to claim 1 in which said return means includes spring means yieldingly resisting movement of the load holding means toward the load carrying station and includes dampening means opposing said spring means for slowing return of the load holding means from the load carrying station toward the load releasing station.

3. A device according to claim 1 in which said return means comprises compression spring means which is arranged to be compressed as the load holding means moves in the direction of said load carrying station.

4. A device according to claim 1 in which said load holding means comprises jaw means which is open at the load accepting position and closed at the load retaining position, and spring means yieldingly resisting opening of said jaw means.

5. A device according to claim 4 in which said releasing means comprises movably mounted cam means carried by said support and cooperating cam means on said jaw means, said movably mounted cam means being shaped to have movement out of the path of said cooperating cam means responsive to engagement therewith when said load holding means is moving toward said load carrying station, a return spring opposing said movement, said movably mounted cam means also being shaped so that when it is returned by said return spring it will engage said cooperating cam means and force said jaw means open while said holding means is moving in the direction of said load accepting station.

6. A device according to claim 1 in which said load holding means comprises jaw means which is open at the load accepting position and closed at the load retaining position, said return means comprising spring means which is arranged to be loaded as the load holding means moves in the direction of said load carrying station, said spring means also yieldingly resisting opening of said jaw means when said load holding means is at said load accepting station, and dampening means for slowing spring return of the load holding means from the load carrying station toward the load releasing station, thereby causing said jaw means to open when they are at the load releasing station.

7. A device according to claim 6 in which said dampening means includes a hydraulic cylinder and a piston working therein, one being connected to said support and the other being connected to said load holding means, and includes check valve and orifice means whereby flow of fluid from one side of the piston to the other side is not restricted when the load holding means is moving toward the load carrying station and is restricted when the load holding means is moving in the opposite direction.

8. A device according to claim 1 in which said load holding means comprises carrier means and jaw means carried by said carrier means, said return means including spring means acting between said support and said carrier means and arranged to be loaded as the jaw means moves in the direction of the load carrying station.

9. A device according to claim 8 in which said return means also includes hydraulic dampening means carried by said support and connected to said carrier means for slowing spring return of said jaw means toward the load releasing station.

10. A self-releasing choker for use with a ferrule connected to the end of a cable, comprising:

a casing;

ferrule holding means carried by the casing and movable relative thereto between a ferrule accepting position and a ferrule retaining position, said ferrule holding means also being movable relative to said casing between (a) a ferrule accepting station whereat the ferrule holding means is free to accept a ferrule and move to the ferrule retaining position, (b) a load carrying station whereat the ferrule holding means is held in ferrule retaining position, and (c) a ferrule releasing station located intermediate said ferrule accepting and load carrying stations whereat the ferrule holding means can move from its ferrule retaining position to its ferrule accepting position;

locking means for keeping the ferrule holding means in its ferrule retaining position while at the load carrying position;

releasing means operatively associated with the ferrule holding means, said releasing means having an inactive mode when the ferrule holding means is moving past the ferrule releasing station from the ferrule accepting station to the load carrying station, and having an active releasing mode when the ferrule is moving past the ferrule releasing station back toward the ferrule accepting station whereby the ferrule holding means is moved from its ferrule retaining position back to its ferrule accepting position to release the ferrule; and return means for the ferrule holding means acting between said ferrule holding means and said casing for yieldingly resisting movement of the ferrule holding means from the ferrule accepting station toward the load carrying station responsive to application of load to a ferrule held by the ferrule holding means.

11. A self-releasing choker according to claim 10 in which said ferrule holding means comprises jaws having opposed bottom lips adapted to engage the cable end of a ferrule, said casing having at one end an opening for receiving the ferrule and having shoulders adjoining said opening for engagement by said lips so that load on the ferrule is transmitted to said shoulders via said lips when the jaws are at said load carrying station.

12. A self-releasing choker according to claim 11 in which said return means includes spring means yieldingly resisting movement of said jaws toward the load carrying station and includes hydraulic dampening means at the other end of said casing opposing said spring means for slowing return of the jaws from the load carrying station toward the ferrule releasing station.

* * * * *